United States Patent
Aubert et al.

(10) Patent No.: US 12,505,326 B2
(45) Date of Patent: Dec. 23, 2025

(54) CHIP CARD WITH BIOMETRIC SENSOR

(71) Applicant: SMART PACKAGING SOLUTIONS, Rousset (FR)

(72) Inventors: Damien Aubert, Rousset (FR); Turelier Mathieu, Rousset (FR)

(73) Assignee: Smart Packaging Solutions, Rousset (FR)

( * ) Notice: Subject to any disclaimer, the term of this patent is extended or adjusted under 35 U.S.C. 154(b) by 0 days.

(21) Appl. No.: 18/701,177

(22) PCT Filed: Oct. 14, 2022

(86) PCT No.: PCT/FR2022/000093
§ 371 (c)(1),
(2) Date: Apr. 12, 2024

(87) PCT Pub. No.: WO2023/062293
PCT Pub. Date: Apr. 20, 2023

(65) Prior Publication Data
US 2024/0412025 A1    Dec. 12, 2024

(30) Foreign Application Priority Data
Oct. 14, 2021   (FR) ........................ 2110915

(51) Int. Cl.
G06K 19/073    (2006.01)
(52) U.S. Cl.
CPC .............. G06K 19/07354 (2013.01)
(58) Field of Classification Search
CPC ............ G06K 19/07354; G06K 19/0718
(Continued)

(56) References Cited

U.S. PATENT DOCUMENTS 8,823,497 B2 *   9/2014   Hutzler ............... G07F 7/0833
                                                                235/382
9,342,774 B1 *   5/2016   Lin ..................... G06K 19/0718
(Continued)

FOREIGN PATENT DOCUMENTS

| | | |
|---|---|---|
| FR | 2 776 796 A1 | 10/1999 |
| WO | 2018035258 A1 | 2/2018 |
| WO | 2018/158644 A1 | 9/2018 |

OTHER PUBLICATIONS

PCT International Search Report, Application No. PCT/FR2022/000093, mailed Feb. 9, 2023, 6 pages.
(Continued)

*Primary Examiner* — Ahshik Kim
(74) *Attorney, Agent, or Firm* — McDonnell Boehnen Hulbert & Berghoff LLP (57) ABSTRACT

The invention relates to a portable communicating object (20) the operating mode of which is a contact or contactless mode, or a hybrid mode which is both contact and contactless, said object comprising a body (50) having external protective layers (15, 16) and an insert (40) placed between said protective layers, said insert (40) comprising a substrate (41) bearing a first electronic component (11; 60) having first connection pads (17) and further bearing at least a second electronic component taking the form of an electronic module (12) placed in a cavity (51) of the body (50), which cavity is obtained by machining, said electronic module (12) having second connection pads (18), and said insert (40) further comprising, on the one hand, interconnecting tracks (21, 22, 23, 24) intended to connect said first electronic component (11; 60) with said electronic module (12) so as to ensure electrical power is supplied thereto or data transferred therebetween, and on the other hand, connecting tracks (29) between said first electronic component (11; 60) and said interconnecting tracks (21, 22, 23, 24),
(Continued)

characterized in that said connecting tracks (29) are located on the same side of the insert (40) as the electronic module (12) and in that they have a thickness at least equivalent to the absolute value of the machining tolerance (T) of said cavity (50).

20 Claims, 5 Drawing Sheets

(58) Field of Classification Search
 USPC .......................................................... 235/492
 See application file for complete search history.

(56) References Cited

U.S. PATENT DOCUMENTS

| 10,977,537 | B2* | 4/2021 | Amin | G06Q 20/1085 |
|---|---|---|---|---|
| 11,113,593 | B2* | 9/2021 | Finn | G06K 19/07784 |
| 2024/0070425 | A1* | 2/2024 | Lowe | G06K 19/0718 |
| 2024/0242054 | A1* | 7/2024 | Kluge | G06K 19/0772 |
| 2024/0320461 | A1* | 9/2024 | Katano | H05K 1/18 |
| 2024/0330638 | A1* | 10/2024 | Jang | G06K 19/07354 |
| 2024/0354742 | A1* | 10/2024 | Alary | H04B 5/77 |

OTHER PUBLICATIONS

PCT Written Opinion and English machine translation, Application No. PCT/FR2022/000093, mailed Feb. 9, 2023, 7 pages.

* cited by examiner

CHIP CARD WITH BIOMETRIC SENSOR

CROSS-REFERENCE TO RELATED APPLICATIONS

The present application is a national stage entry of PCT/FR2022/000093 filed Oct. 14, 2022, which claims priority to FR 2110915 filed Oct. 14, 2021, the contents of each of which are hereby incorporated by reference.

The disclosure relates to secure and communicating portable objects such as in particular bank cards or identification documents with a chip, provided with a first microelectronic module with contact-based or contactless operation or with mixed contact-based and contactless operation, and with a second electronic module or component such as a biometric sensor intended to communicate with the first module, in particular in order to transmit biometric information in relation to the user of the chip card thereto.

By way of example and to simplify the disclosure, example embodiments will be described primarily in the context of the application thereof to chip cards provided with a fingerprint sensor, without however limiting the scope of the disclosure to other portable objects or other shape factors, and to other types of electronic components such as for example screens, biometric sensors of any kind, or even discrete electronic components not mounted in a support module.

Chip cards with contactless operation produced in the ISO 7816 format and used for banking applications constitute the most widespread example of identification cards to which the disclosure is applicable. However, the disclosure also applies to other types of secure documents, in particular passports and other security documents used for digital identification applications.

BACKGROUND

The majority of contactless chip cards or dual cards with mixed contact-based and contactless operation include a card body, an electronic module inserted into a cavity in the card body and provided with a microelectronic chip, and an antenna arranged in the card body. The antenna is galvanically connected to output pads of the microelectronic chip, that is to say coupled inductively to a smaller antenna integrated directly into the electronic module of the chip card. In both configurations, the antenna of the card body allows radiofrequency communication with the antenna of a chip card reader.

The antenna of the card body generally consists of turns that are produced using electrically conductive tracks, arranged on a flexible insert or substrate that is integrated into the card body and laminated with the layers thereof during the assembly of the card.

As an alternative, there are chip cards with purely contact-based operation the body of which does not include an antenna.

In a certain number of applications, integration of one or more additional electronic modules or components into the chip card in addition to the main module or component may be performed, for example in order to integrate biometric sensors able to collect biometric information and transmit the biometric information to the main module or component for the purpose of carrying out biometric identification of the user of the chip card.

Figure 1:
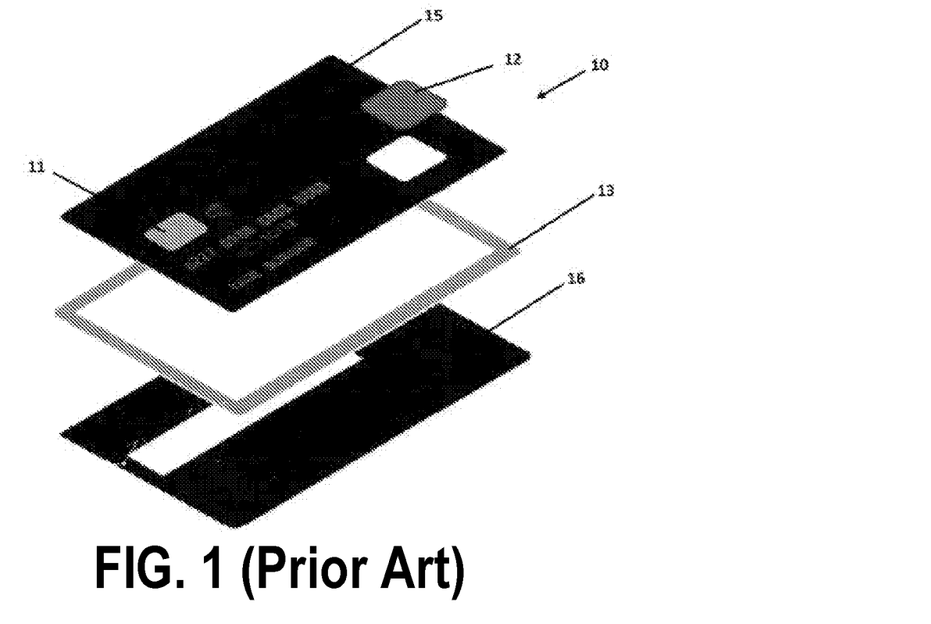
FIG. 1 shows a contact-based and contactless chip card, in an exploded perspective view.

In this case, as for example in the case of the card shown in FIG. 1, the one or more biometric sensors and the main contact-based or contactless module are arranged on a relatively rigid support in the form of a board, also referred to as PCB (printed circuit board), on which the components are interconnected. This arrangement exhibits numerous drawbacks.

Indeed, the interconnection of multiple electronic modules arranged on a PCB support is expensive since it may include additional electronic components that are not integrated into the electronic modules of the chip card, and include modifying the conventional chip card manufacturing processes, thereby leading to non-negligible excess costs. It is also unreliable over time since repeated bending that the product will have to undergo during use thereof risks breaking the electrical interconnections formed on the PCB between the modules more or less quickly.

However, the market is demanding increased reliability and a lower cost for chip cards or the like provided with a main contact-based or contactless electronic module, on the one hand, and with a biometric sensor or another secondary module, on the other hand. This may include finding a technique for eliminating the PCB substrate and finding an alternative, more reliable and less expensive technique for interconnecting the main electronic module of the chip card, which serves in particular to identify the card holder, and the biometric sensor or the like, such as for example a fingerprint sensor, in order to ensure that all active and passive electronic components of the chip card are distributed entirely between the main electronic module and the secondary electronic module without requiring a PCB support.

Document WO 2018/158644 A1 discloses a chip card that includes a first banking payment electronic module and a second electronic module provided with a biometric sensor, the two modules being connected to an antenna able to communicate with an external reader. The antenna is used both for the interconnection between the two modules and for radiofrequency communication. The connection between the modules and the antenna is produced by solder drops or an anisotropic conductive film. Added connection pads are arranged on the insert and connected to the antenna using an additive process that locally creates an excess thickness enabling a connection between the module and the antenna after the cavity receiving the module has been machined.

Document FR 2 776 796 A1 also discloses a chip card provided with a payment module and a display controlled by a microcontroller. The various components are connected by floating electrical wires.

SUMMARY

The disclosure provides a communicating portable object structure, in particular for a chip card or the like, that does not exhibit the above drawbacks, and in particular a structure allowing the various main electronic modules or chips and secondary modules such as biometric sensors integrated into the chip card or equivalent security documents to communicate with one another, without requiring a PCB support provided with discrete electronic components.

The disclosure also provides a chip card or the like including multiple electronic modules capable of communicating with one another, but remaining compatible with a pre-existing and well-controlled chip card manufacturing method, namely transferring thick electronic modules into cavities formed in the card body, and using the corresponding fleet of conventional manufacturing machines.

The disclosure also provides a chip card including multiple electronic modules provided with connection pads that are potentially located in different planes in the thickness of the card, and with interconnection or connection tracks that are capable of compensating for these positioning differences.

The disclosure also provides a chip card structure provided with an insert that makes it possible to easily adapt to various architectures, such as for example a chip card provided with two thick modules, or with a thick module and a microelectronic chip mounted in a "flip-chip" configuration.

The disclosure provides an asymmetric insert (also called an inlay), provided with a substrate including, on a first face, thin conductor tracks, in particular made of aluminum, of the order of 10 µm, so as to form interconnection tracks between the various electronic modules or components of a chip card integrating the insert, and the substrate including, on a second face, thicker tracks, of the order of 80 µm (e.g., made of aluminum) for the connection between the interconnection tracks and the connection pads of a relatively thick electronic module. The cavity intended to receive the electronic module is then machined at the connection tracks, the thickness of which is calculated on the basis of the thickness of the substrate of the module and the machining tolerance of the cavity of the module to be integrated. It thereby becomes possible to integrate modules of slightly different thicknesses or modules including slightly different machining depths on one and the same type of insert, the differences in machining depth being absorbed by the sufficient thickness of the connection tracks.

Example embodiments relate to a communicating portable object with contact-based or contactless operation or with mixed contact-based and contactless operation, including a body having external protective layers and an insert arranged between the protective layers, the insert including a substrate carrying a first electronic component having first connection pads and also carrying at least one second electronic component in the form of an electronic module arranged in a cavity of the body that is obtained by machining, the electronic module having second connection pads, and the insert furthermore including interconnection tracks intended to connect the first electronic component to the electronic module so as to provide a power supply for them or transfer data between them, on the one hand, and connection tracks between the first electronic component and the interconnection tracks, on the other hand, characterized in that the connection tracks are located on the same side of the insert as the electronic module and in that they have a thickness at least equivalent to the absolute value of the machining tolerance (T) of the cavity.

According to some embodiments, the first component and the second electronic component are electronic modules and consist of a substrate provided with a microelectronic chip that is protected by a drop of coating resin.

According to some embodiments, the thickness (denoted E) of the connection tracks in each electronic module is at least equal to the absolute value of the machining tolerance (denoted T) of the cavities of the electronic modules, plus a small margin (denoted R) corresponding to the residual thickness of the connection tracks after each cavity has been machined in order to ensure electrical continuity of the connection tracks, this then being expressed by the relationship: $E=T+R$.

According to some embodiments, the absolute value of the machining tolerance (T) is of the order of 70 µm and the connection tracks have a thickness of the order of 80 µm.

In practice, there may be a difference (denoted D) in thickness between the value of the thicknesses of the substrates of the two electronic modules, and in this case the thickness (denoted E) of the connection tracks (29) in each module (11, 12) may be at least equal to the absolute value of the machining tolerance (denoted T) of the cavities of the electronic modules, plus a small margin (denoted R) corresponding to the residual thickness of the connection tracks after the cavities have been machined in order to ensure electrical continuity thereof, plus the difference in thickness (D) of the substrates of the modules, this being expressed by the relationship: $E=T+R+D$.

By way of example, the substrate of the first electronic module has a thickness of the order of 200 µm, the substrate of the second electronic module has a thickness of the order of 210 µm, the difference D between the two thicknesses is of the order of 10 µm, and the thickness of the connection tracks is of the order of 80+10=90 µm.

According to some embodiments, the second electronic module includes a biometric sensor, in particular a fingerprint sensor.

According to some embodiments, the first component is a microelectronic chip mounted in a "flip-chip" configuration on one of the faces of the insert.

According to some embodiments, the first electronic component is a contact-based module arranged on the same face of the portable object as the second electronic component, and the connection tracks merge with the interconnection tracks between the first component and the second component.

According to some embodiments, the first electronic component is a contactless module or a dual-communication-interface module, and the insert includes an antenna produced in the form of conductor tracks located on one of the faces of the insert.

According to some embodiments, the interconnection tracks are located on a face of the substrate.

According to some embodiments, the interconnection tracks have a thickness of between 10 and 30 µm, and the connection tracks have a thickness of between 70 and 100 µm.

According to some embodiments, a first end of each connection track is connected to a connection pad of an electronic component by an anisotropic conductive adhesive.

According to some embodiments, a second end of each connection track is connected to an end of an interconnection track by way of a crimp connection.

According to some embodiments, the insert includes a polymer substrate with a thickness of between 25 and 250 µm (e.g., between 25 and 50 µm,) and the interconnection tracks and the connection tracks are made of aluminum on the polymer substrate.

According to some embodiments, the polymer substrate has two opposing faces and the interconnection tracks are formed on a first face of the substrate and the connection tracks are formed on a second face of the substrate.

According to some embodiments, the first electronic component is an electronic module including a module antenna electromagnetically coupled to a booster antenna located on the insert and electromagnetically coupled to an antenna that is also arranged on the insert and provides the radiofrequency link to the antenna of the reader.

According to some embodiments, each electronic module includes its own module antenna, coupled respectively to a booster antenna located on the insert and electromagnetically coupled to an antenna that is also arranged on the insert and provides the radiofrequency link to the antenna of the reader.

According to some embodiments, the communicating portable object is in the form of a chip card in the ID-1 format defined in the ISO 7810 standard, or in the format of an ID-3 electronic passport in accordance with the ISO 7810 standard.

Example embodiments also provide a method for manufacturing a communicating portable object as defined above, including steps of preparing an insert provided with tracks of an antenna, with at least two electronic modules or components provided with connection pads and with interconnection tracks extending between the electronic modules or components, characterized in that it furthermore includes the following steps:

forming, on a face of the insert, connection tracks with a thickness greater than the thickness of the tracks of the antennas and interconnection tracks, each connection track being arranged between a connection pad of the electronic modules and an end of an interconnection track;

interconnecting the ends of the connection tracks and the ends of the interconnection tracks by crimping;

assembling protective layers on either side of the insert so as to form a body of the portable object;

machining a face of the body of the portable object so as to form therein at least one cavity able to receive an electronic module;

transferring an electronic module into the cavity and adhesively bonding it there using anisotropic conductive adhesive.

BRIEF DESCRIPTION OF THE DRAWINGS

Other features will become apparent on reading the detailed description given in the context of the application of the disclosure to a chip card, and the appended drawings, in which.

DETAILED DESCRIPTION

Reference is made to FIG. 1, which shows an exploded perspective view of a known chip card 10 with mixed contact-based and contactless operation. This chip card includes a first electronic module 11 provided with standardized contacts (not shown) in accordance with the ISO 7816-1 standard, and a second electronic module 12, which includes in particular biometric sensors such as fingerprint sensors (not shown). The first electronic module 11 includes a microelectronic chip (not shown) that securely stores identification information in relation to the card holder, in particular reference biometric prints of the card holder. In order to authorize a transaction with the chip card 10, the user has to submit their biometric print to the second electronic module 12, and this print then has to be transmitted securely to the first electronic module 11. Hence, a communication channel between the first and second electronic modules 11, 12 may be established.

To this end, the chip card 10 includes a printed circuit board 13 (or PCB) enabling a complex circuit to be set up between the two modules 11, 12, thus both providing the supply of power for the second module 12 from the first module 11 and allowing data communication between the two modules 11, 12. Conventionally, this printed circuit board 13 may include discrete electronic components (not shown) and is integrated between external faces 15, 16 of the chip card, this being more complicated and more expensive to implement than simply transferring a single electronic module into a cavity formed in a monolithic card body, as is commonly carried out for chip cards provided with a single electronic module.

Figure 2A:
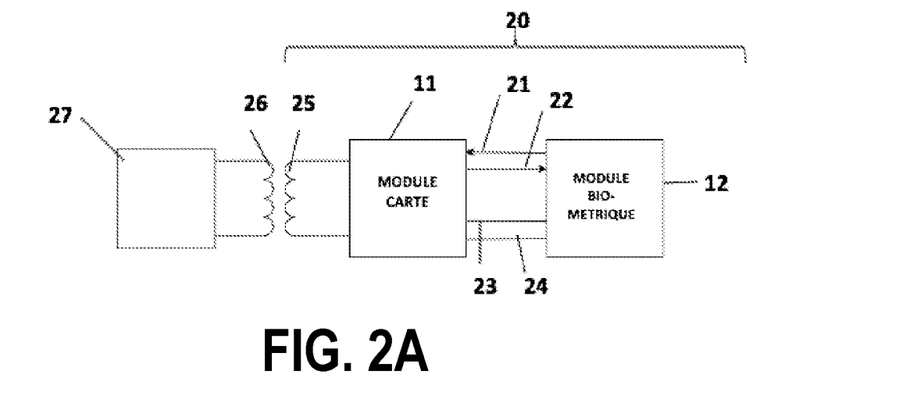
FIG. 2A shows a circuit diagram of an assembly formed by a chip card reader and by a chip card including two electronic modules interconnected by conductor tracks, according to example embodiments.

FIG. 2A shows a circuit diagram of an assembly formed by a chip card 20 provided with two electronic modules 11, 12 interconnected by conductor tracks 21, 22, 23, 24, and by a chip card reader 27. In this case, this involves a chip card 20 of the type with contactless operation, provided with an antenna 25 allowing it to establish a radiofrequency link with the antenna 26 of a remote reader 27 through inductive coupling.

By contrast, the two electronic modules 11, 12, namely for example a conventional main chip card module 11 and a biometric module 12, are connected to one another by galvanic links, namely conductor tracks 21, 22 that are used to transmit and receive data, and conductor tracks 23, 24 that are used to supply electric power to the biometric module 12 from the main module 11, which picks up its energy from the inductive link to the reader 27.

Figure 2B:
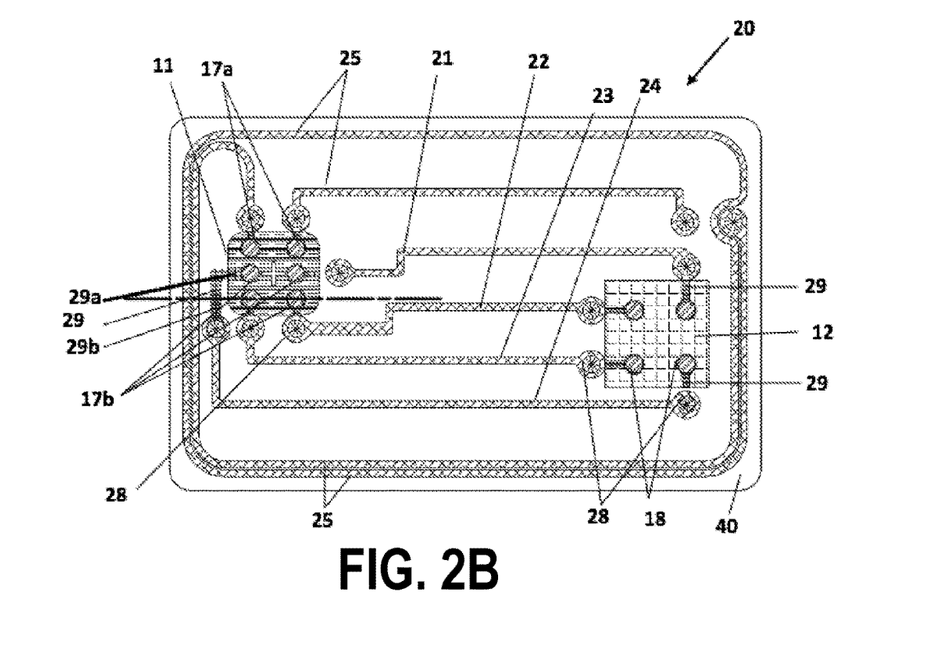
FIG. 2B shows a more detailed plan view of one embodiment of the chip card shown in FIG. 2A, according to example embodiments.

FIG. 2B gives a plan view of a diagram of the implementation of the chip card 20 from FIG. 2A. The main electronic module 11 includes six connection pads 17, namely two connection pads 17a that are connected to a first end of the tracks of the antenna 25 of the chip card, which is an antenna in the format of "ID-1" that is close to the size of the chip card and that follows the edges of the card body, on the one hand, and four connection pads 17b that are connected to a first end of each of the interconnection tracks 21, 22, 23, 24 between the two electronic modules 11, 12, on the other hand. The biometric electronic module 12 includes four connection pads 18 that are connected to the second ends of the interconnection tracks 21, 22, 23, 24 between the two electronic modules 11, 12.

In order to simplify the manufacture of the chip card 20 and to make the manufacture more reliable, the tracks of the antenna 25 and the interconnection tracks 21, 22, 23, 24 may be produced in a similar manner. This involves in particular thin aluminum tracks, of a thickness of the order of 10 µm, produced on a face of an insert 40, for example by chemical etching.

However, given the differences in thickness of the electronic modules 11, 12 and the position of their connection pads 17, 18, which might not be in one and the same plane, particular measures in order to effectively connect the ends of the antenna 25 and the interconnection tracks 21, 22, 23, 24 to the respective connection pads 17, 18 of the electronic modules 11, 12 may be used.

To this end, example embodiments may use conductive connection tracks 29 that are thicker than the antenna tracks 25 and the interconnection tracks 21, 22, 23, 24 of the modules 11, 12. These connection tracks 29 are dimensioned in 3D (that is to say along a Z-axis corresponding to the thickness of the chip card and perpendicular to the X-Y plane of the chip card) and have a thickness sufficient to be able to compensate for or make up for the differences in location on the Z-axis between the ends of the antenna tracks 25, of the interconnection tracks 21-24, and the corresponding connection pads 17, 18 located on the electronic modules 11, 12. In other words, it may be stated that the connection tracks 29 are tracks extending in 3D between the ends of the antenna tracks 25 or interconnection tracks 21-24, and the corresponding connection pads 17, 18 located on the electronic modules 11, 12.

Moreover, the connection tracks 29 are able to be machined and are intended to be machined when forming the cavities for the insertion of the electronic modules 11, 12 into a card body.

Since the modules 11, 12 are positioned in cavities 51 machined in the card body, in order for the connection tracks 29 to be able to fulfill their role and come into contact with the connection pads 17, 18 of the modules 11, 12, the thickness of the connection tracks 29 may be sufficient, in each module and in all scenarios, for the depth of the plane P1 of the cavity (corresponding to the pressing zone for the connection pads of the module) to reach the connection tracks 29 when the cavity is machined, but without passing through these connection tracks 29 and eliminating their entire thickness during the machining operation. It can therefore be important that the thickness (denoted E) of the connection tracks 29 in each module 11, 12 to be at least equal to the absolute value of the machining tolerance of the cavities 51 of the modules 11, 12 (denoted T), plus a small margin (denoted R) corresponding to the residual thickness of the connection track after the cavity has been machined in order to ensure electrical continuity thereof, this then being expressed by the relationship E=T+R. Thus, by way of example, if the cavity 51 of a module has to be machined to a depth P1+/−35 µm, the recommended thickness of the connection track 29 will be for example of the order of 80 µm.

If, in practice, there is a difference D in thickness between the value of the thicknesses of the substrates of the two modules, the upper recommended thickness E of the connection track 29 should then be increased by the value of this difference D. The recommended value of the thickness E of the connection track 29 will then be equal to T+R+D. For example, if the first module 11 has a substrate thickness of 200 µm and the second module 12 has a thickness of 210 µm, then the difference D is equal to 10 µm, and the recommended thickness of the connection track 29 will be of the order of 80+10=90 µm.

In some embodiments, the connection tracks 29 are produced on the insert 40 and positioned on the same side of the chip card as the electronic modules 11, 12 when these are assembled on the chip card, whereas the antenna tracks 25 and the interconnection tracks 21-24 are produced on the opposite face of the insert 40. The ends 29b of the connection tracks 29 and the ends of the interconnection tracks 21-24 are interconnected for example by crimp connections 28.

In practice, the connection tracks 29 will generally have a thickness of the order of 70 to 100 µm, in the case of a chip card having a thickness of the order of 800 µm.

The connection tracks 29 have a first end 29a that is positioned facing a corresponding connection pad 17, 18 of the electronic modules 11, 12. This first end 29a is machined in part during the machining of the cavity 51 for receiving each electronic module. This machining makes it possible to locally bring the thickness of the end 29a of the connection track 29 to the exact level intended for the positioning of the connection pads 17, 18 of the electronic modules 11, 12. The machined surface of this first end 29a may then be electrically connected to the corresponding connection pad 17, 18 of a module 11, 12 by way of a thin layer of anisotropic conductive adhesive, denoted ACF, which may be dispensed at the same time as the adhesive for fastening each electronic module 11, 12 in its respective cavity of the card body is dispensed.

In the case of a chip card with contactless operation and therefore provided with an antenna 25 (FIG. 2B), the connection tracks 29 have a second end 29b that is positioned facing an end of one of the antenna tracks 25 or interconnection tracks 21-24. The second end 29b of the connection tracks 29 is connected to the corresponding end of an antenna track 25 or of an interconnection track 21-24 by way of a metal via, or a crimp connection 28.

Figure 2C:
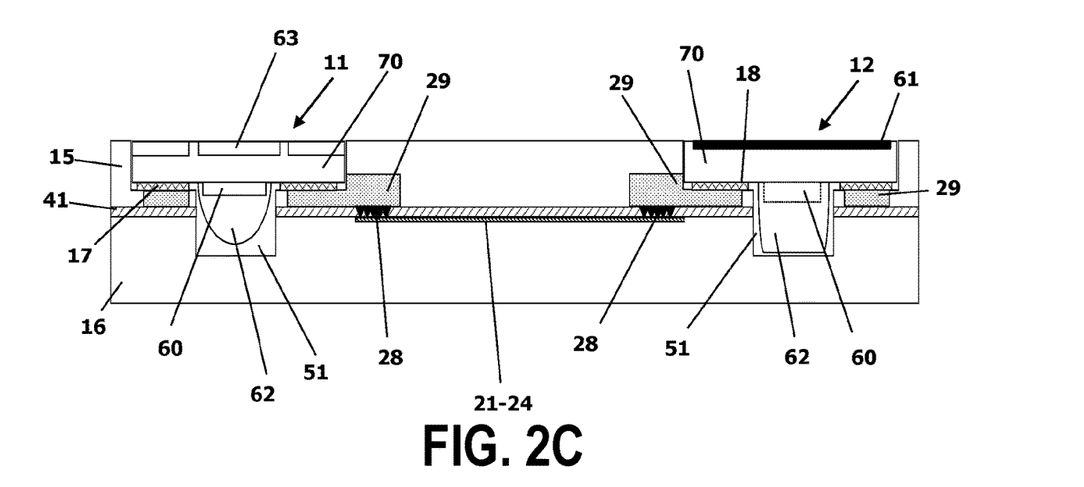
FIG. 2C shows a simplified sectional view of the chip card according to FIG. 2B, passing through the two electronic modules of the chip card, according to example embodiments.

FIG. 2C shows a sectional view of the chip card 20 from FIG. 2B, passing through the two modules 11, 12. It should be noted that, given the small thickness of the various layers of the chip card, the thicknesses have been shown in enlarged form, and they are not to scale.

The first electronic module 11 is a conventional dual-communication-interface module, including a substrate 70 and, on its upper face, contacts 63 in the ISO 7816 format. A microelectronic chip 60 is fastened underneath the substrate 70 and protected by a drop of encapsulating resin 62. The output terminals of the microelectronic chip 60 are connected to connection pads 17 of the module 11.

The second electronic module 12 is a module with a similar structure but including a biometric sensor 61, for example a fingerprint sensor, on its upper face. The chip 60 of this module is connected to connection pads 18 of the module 12. The connection pads 17, 18 are connected to respective connection tracks 29, which are interconnected by interconnection tracks 21-24 via crimp connections 28.

Figure 2D:
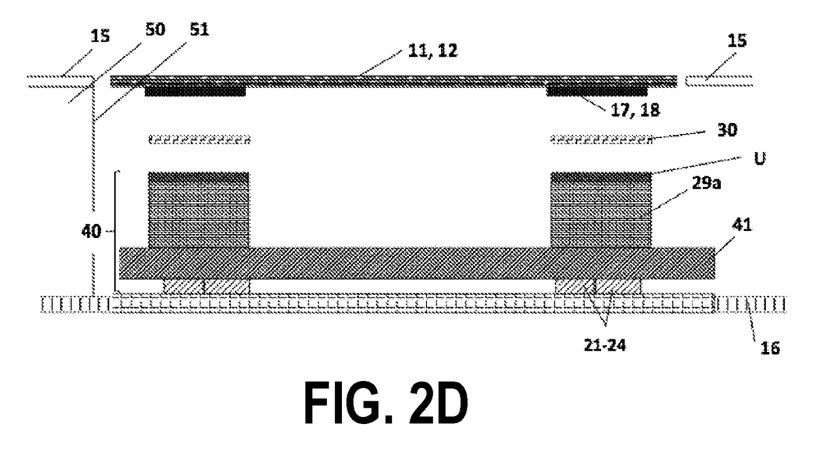
FIG. 2D shows a detailed sectional view of the layers of the chip card of FIG. 2B, before assembly, focusing on a single electronic module, according to example embodiments.
Figure 2E:
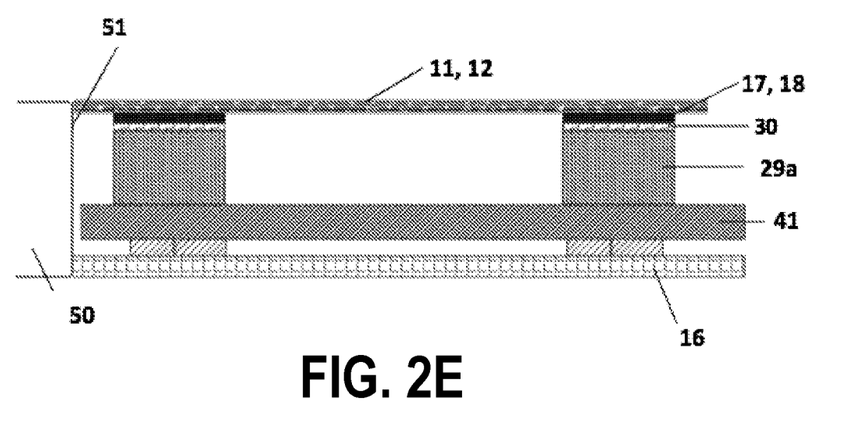
FIG. 2E shows a detailed sectional view of the layers of the chip card of FIG. 2B, after assembly, according to example embodiments.

FIGS. 2D and 2E correspond to a partial section of the chip card from FIG. 2B at the electronic module 11 along the dashed cutting line of FIG. 2B. FIG. 2D shows an exploded view, corresponding to the situation before the chip card 20 is assembled. The card body 50 includes an upper protective layer 15, a lower protective layer 16, and an insert 40 placed between these two layers. The insert 40 is inserted into a cavity 51 of the card body and closed off at the upper face 15 by the electronic module 11. The structure is the same at the part of the card body that carries the biometric module 12, not shown in this figure.

The insert 40 includes a plastic substrate 41 on which there have been formed, on one face, for example the lower face, conductor tracks 21-24, in particular made of aluminum, for the interconnection of the modules 11, 12. The upper face of the substrate 41 carries the connection tracks 29, according to example embodiments. These are also made of aluminum, and are thicker than the interconnection tracks 21-24. The upper part U thereof corresponds to the zone that will be machined when the cavity 51 is machined. When the electronic module 11 is transferred into the cavity 51 of the card body, the connection pads 17, 18 of the module 11 or of the module 12, respectively, will be adhesively bonded to the upper face of the ends 29a of the connection tracks 29, by way of a thin layer of anisotropic conductive adhesive 30.

FIG. 2E shows the same structure as FIG. 2D, after the modules 11, 12 have been transferred to the card body 50. As may be seen, the upper part U of the connection track 29 shown in FIG. 2C has disappeared, since it was machined when each of the cavities 51 was machined. This machining is carried out to a depth tailored to the potentially different thickness between the modules 11, 12.

More precisely, the connection tracks 29 are designed so as to originally have a greater thickness so as to take account of the machining tolerances T of the cavity, meaning that they impinge into the zone intended for the cavities of the modules. By virtue of the step of machining the cavities, the excess thickness of the ends 29a of the connection tracks 29 is reduced until the final thickness of these connection tracks is adapted to the thickness of each module, namely that of the main identification module 11 and that of the second electronic module 12.

Thus, after this step of machining each cavity 51, the machined surfaces of the ends of the connection tracks 29 are located at the bottom of the cavities exactly at a depth corresponding to the thickness of the substrate of each module 11, 12 at its connection pads, thereby allowing each module to be inserted and adhesively bonded precisely, even when the modules have different thicknesses.

Figure 3A:
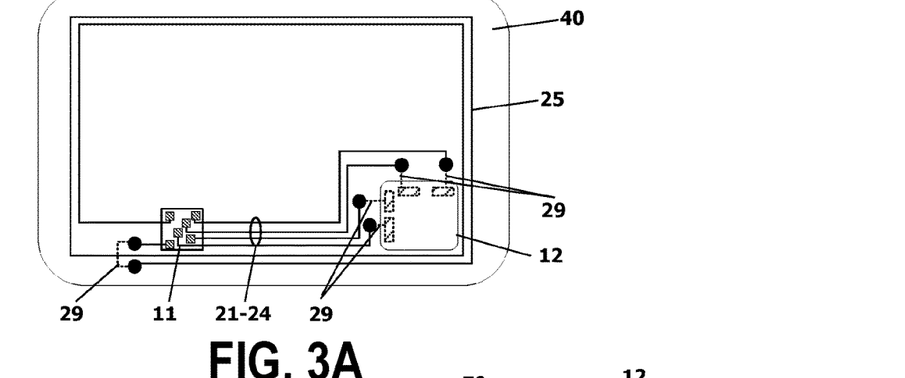
FIG. 3A is a plan view of an insert for a chip card, according to one example embodiments.
Figure 3B:
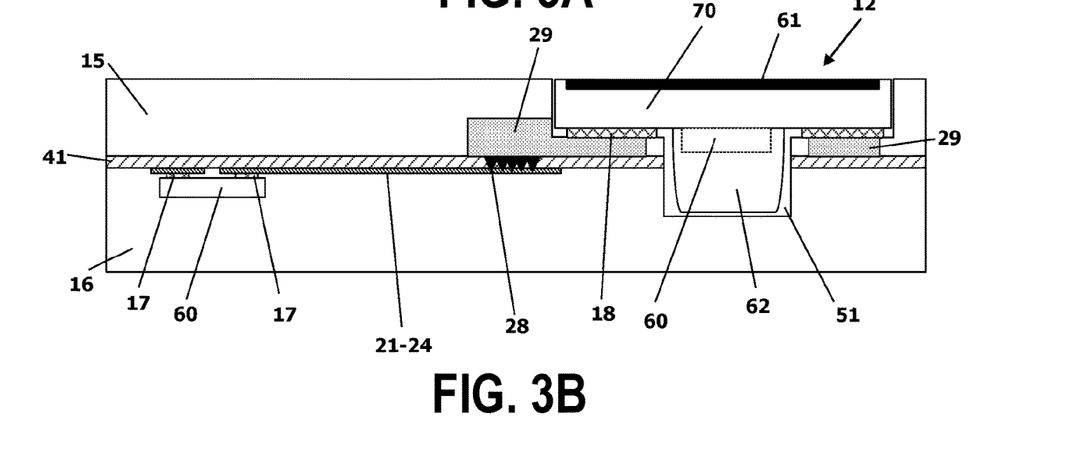
FIG. 3B is a sectional view of a chip card integrating an insert according to FIG. 3A, according to example embodiments.

FIGS. 3A and 3B show an example embodiment, modifying the type of electronic modules or electronic components integrated into the chip card.

In these figures FIGS. 3A and 3B, the chip card is provided with a main component 11 in the form of a microelectronic chip connected directly to the lower face of the substrate 41 of the insert 40 in a "flip-chip" configuration, and with a secondary component formed by a biometric module 12. The upper surface of this biometric module integrates a print sensor 61. It includes a microelectronic chip 60 protected by a drop of encapsulating resin 62 and housed in the cavity 51 of the card body. As may be seen in FIG. 3B, the machining of the plane, referred to as "P1", of the cavity 51, corresponding to the thickness of the substrate of the module 12, has locally cut into the thickness of the connection tracks 29, and the contact pads 18 of the module are then electrically connected to the interconnection tracks 21-24 via the connection tracks 29, and the crimp connections 28.

In other embodiments (not shown), it is possible to provide a chip card with just contact-based operation, including two electronic modules arranged on one and the same face of the chip card. In this scenario, it is possible to use a single-face insert metallized on just one face, and then the connection and interconnection tracks between the modules may merge and have the same thickness, namely the thickness that is at least equal to the machining tolerance T of the cavities plus a margin R, as explained above.

Figure 4:
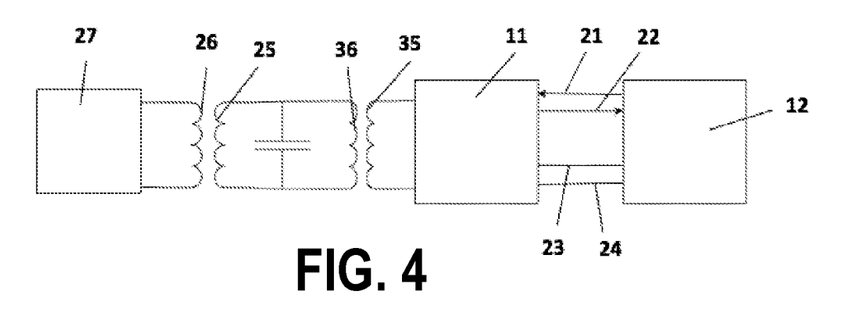
FIG. 4 shows a variant of the circuit diagram of an assembly formed by a chip card reader and by a chip card provided with two electronic modules interconnected by tracks, in which only the main electronic module is provided with a booster, according to example embodiments.

FIG. 4 shows a variant of the circuit diagram of an assembly formed by a chip card reader 27 and by a chip card 20 provided with two electronic modules 11, 12 interconnected by tracks 21-24, according to example embodiments. In some embodiments, the main electronic module 11 is provided with a module antenna 35, coupled to a booster antenna 36, which is itself electromagnetically coupled to the main antenna 25 in the ID-1 format. The latter is in turn coupled to the antenna 26 of a remote chip card reader 27. Therefore, in some embodiments, the interconnections between the tracks 21-24 and the corresponding connection pads 17, 18 of the electronic modules 11, 12 are again implemented using connection tracks 29 (not shown), in exactly the same way as in the embodiment corresponding to FIG. 2.

Figure 5:
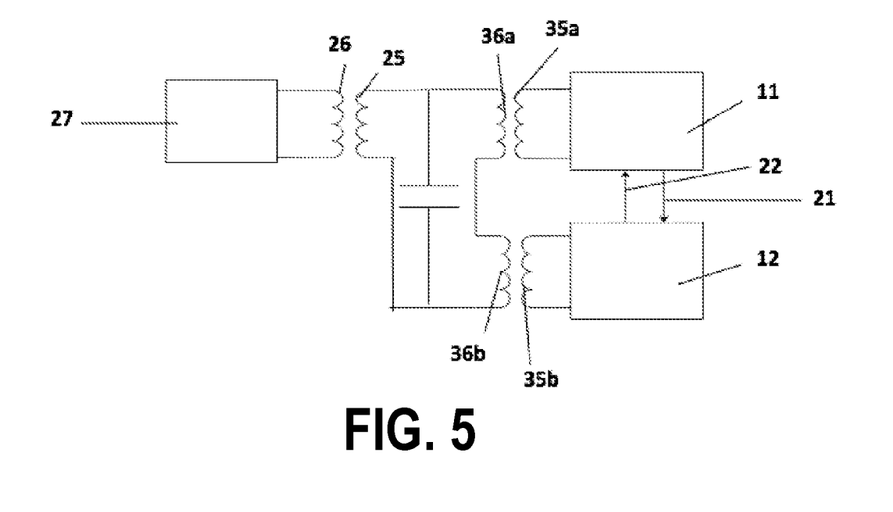
FIG. 5 shows a variant of the circuit diagram of an assembly formed by a chip card reader and by a chip card provided with two electronic modules interconnected by tracks, but each of the electronic modules being provided with a booster, according to example embodiments.

FIG. 5 shows another variant of the circuit diagram of an assembly formed by a chip card reader 27 and by a chip card 20 provided with two electronic modules 11, 12 interconnected by interconnection tracks, according to example embodiments. In some embodiments, both the main electronic module 11 and the biometric module 12 are provided with their own module antenna 35a, 35b that is coupled to a respective booster 36a, 36b, and each module 11, 12 is therefore supplied with energy through electromagnetic coupling between the antenna 25 of the chip card and the antenna 27 of the reader. In this scenario, the two electronic modules 11, 12 are now galvanically interconnected only by interconnection tracks 21-22 that transfer data. These two interconnections 21, 22 may also be formed by connection tracks 29 (not shown), as described above in conjunction with the embodiment of FIG. 2.

CONCLUSION

In conclusion, example embodiments propose a communicating portable object, in particular a chip card 20 or an electronic passport. In particular, the use of an insert provided with connection tracks 29 having an excess thickness and able to be machined locally to a thickness that takes account of the machining tolerances of the cavities and that is tailored to the thickness of each electronic module makes it possible to interconnect the electronic modules more effectively without having to use a printed circuit board PCB, thereby contributing to reducing the manufacturing cost of the chip card and increasing manufacturing yield.

Moreover, the structure of the chip card according to example embodiments is compatible with conventional low-cost and high-yield manufacturing methods, consisting in machining cavities in the card body and then integrating electronic modules into these surface cavities of the card body.

The proposed technique makes it possible to integrate, into the chip card or into an equivalent communicating device, an insert that is already equipped with components able to enter into a connection with an inlaid module according to example embodiments.

The invention claimed is:

1. A communicating portable object with contact-based or contactless operation or with mixed contact-based and contactless operation, comprising a body having external protective layers and an insert arranged between said protective layers, said insert comprising a substrate carrying a first electronic component having first connection pads and also carrying at least one second electronic component in the form of a second electronic module arranged in a cavity of the body that is obtained by machining, said second electronic module having second connection pads, and said insert furthermore comprising: (i) interconnection tracks intended to connect said first electronic component to said second electronic module so as to provide a power supply for the first electronic component and the second electronic component or transfer data between the first electronic component and the second electronic component; and (ii) connection tracks between said first electronic component and said interconnection tracks, wherein said connection tracks are located on the same side of the insert as the second electronic module.

2. The communicating portable object according to claim 1, wherein said first electronic component is a first electronic module similar to the second electronic module, and wherein the first electronic module and the second electronic module comprise a substrate provided with a microelectronic chip that is protected by a drop of coating resin.

3. The communicating portable object according to claim 2, wherein a thickness (E) of the connection tracks in each of the first electronic module and the second electronic module is at least 70 µm plus a small margin (R) corresponding to a residual thickness of the connection tracks after the cavities have been machined in order to ensure electrical continuity of the connection tracks.

4. The communicating portable object according to claim 1, wherein the connection tracks have a thickness of about 80 µm.

5. The communicating portable object according to claim 2, wherein there is a difference (D) in thickness between the substrate of the first electronic module and the substrate of the second electronic module, wherein a thickness (E) of the connection tracks in each of the first electronic module and the second electronic module is at least 70 µm plus a small margin (R) corresponding to a residual thickness of the connection tracks after the cavities have been machined in order to ensure electrical continuity thereof plus the difference in thickness (D), this being expressed by: $E=70\,\mu m+R+D$.

6. The communicating portable object according to claim 5, wherein the substrate of the first electronic module has a thickness of about 200 µm, the substrate of the second electronic module has a thickness of about 210 µm, the difference D between the thickness of the substrate of the first electronic module and the thickness of the substrate of the second electronic module is about 10 µm, and the thickness of the connection tracks is about.

7. The communicating portable object according to claim 2, wherein said second electronic module comprises a biometric sensor.

8. The communicating portable object according to claim 1, wherein said first electronic component is a microelectronic chip mounted in a "flip-chip" configuration on one of the faces of the insert.

9. The communicating portable object according to claim 1, wherein said first electronic component is a contact-based module arranged on the same face of the portable object as the second electronic component, and wherein the connection tracks merge with the interconnection tracks between the first electronic component and the second electronic component.

10. The communicating portable object according to claim 2, said first electronic component being a contactless module or a dual-communication-interface module, wherein the insert comprises an antenna produced as tracks located on one of the faces of the insert.

11. The communicating portable object according to claim 1, wherein the interconnection tracks are located on a face of the substrate.

12. The communicating portable object according to claim 1, wherein the interconnection tracks have a thickness of between 10 µm and 30 µm, and wherein said connection tracks have a thickness of between 70 µm and 100 µm.

13. The communicating portable object according to claim 1, wherein a first end of each connection track is connected to a connection pad of the first electronic component or the second electronic component by an anisotropic conductive adhesive.

14. The communicating portable object according to claim 1, wherein a second end of each connection track is connected to an end of an interconnection track by way of a crimp connection.

15. The communicating portable object according to claim 1, wherein the insert comprises a polymer substrate with a thickness of between 25 µm and 250 µm, and wherein the interconnection tracks and the connection tracks are made of aluminum on said polymer substrate.

16. The communicating portable object according to claim 1, wherein said substrate has two opposing faces and in that the interconnection tracks are formed on a first face and that the connection tracks are formed on a second face of said substrate.

17. The communicating portable object according to claim 2, wherein said first electronic component is a first electronic module comprising a module antenna electromagnetically coupled to a booster antenna located on the insert and electromagnetically coupled to an antenna that is also arranged on the insert and provides a radiofrequency link to the antenna of a reader.

18. The communicating portable object according to claim 2, wherein each electronic module comprises its own module antenna, coupled respectively to a booster antenna located on the insert and electromagnetically coupled to an antenna that is also arranged on the insert and provides a radiofrequency link to the antenna of a reader.

19. The communicating portable object according to claim 1, wherein the communicating portable object is a chip card in the ID-1 format defined in the ISO 7810 standard or in the format of an ID-3 electronic passport in accordance with the ISO 7810 standard.

20. A method for manufacturing a communicating portable object,
wherein the communicating portable object has contact-based or contactless operation or with mixed contact-based and contactless operation, wherein the communicating portable object comprises a body having external protective layers and an insert arranged between said protective layers, said insert comprising a substrate carrying a first electronic component having first connection pads and also carrying at least one second electronic component in the form of a second electronic module arranged in a cavity of the body that is obtained by machining, said second electronic module having second connection pads, and said insert furthermore comprising: (i) interconnection tracks intended to connect said first electronic component to said second electronic module so as to provide a power supply for the first electronic component and the second electronic component or transfer data between the first electronic component and the second electronic component; and (ii) connection tracks between said first electronic component and said interconnection tracks, wherein said connection tracks are located on the same side of the insert as the second electronic module, and wherein the method comprises:
  preparing an insert provided with tracks of an antenna, with at least the first and second electronic components provided with connection pads and with interconnection tracks extending between said electronic modules or components;
  forming, on a face of the insert, connection tracks with a thickness greater than the thickness of the tracks of the antennas and interconnection tracks, each connection track being arranged between a connection pad of the first electronic component and the second electronic component and an end of an interconnection track;
  interconnecting the ends of the connection tracks and the ends of the interconnection tracks by crimping;
  assembling protective layers on either side of the insert so as to form a body of the portable object;
  machining a face of the body of the portable object so as to form therein at least one cavity able to receive the first electronic component or the second electronic component; and
  transferring the first electronic component or the second electronic component into said cavity and adhesively bonding the first electronic component or the second electronic component to the cavity using anisotropic conductive adhesive.

* * * * *